(No Model.)

F. X. BLACK & J. L. CAREY.
EXPANSION PULLEY.

No. 498,613. Patented May 30, 1893.

Witnesses:
M. S. Bolden
P. P. Sheehan

Frank X. Black
James S. Carey
Inventors by James W. See
Attorney

UNITED STATES PATENT OFFICE.

FRANK X. BLACK AND JAMES L. CAREY, OF HAMILTON, OHIO, ASSIGNORS TO THE BLACK & CLAWSON COMPANY, OF SAME PLACE.

EXPANSION-PULLEY.

SPECIFICATION forming part of Letters Patent No. 498,613, dated May 30, 1893.

Application filed February 11, 1893. Serial No. 461,927. (No model.)

*To all whom it may concern:*

Be it known that we, FRANK X. BLACK and JAMES L. CAREY, of Hamilton, Butler county, Ohio, have invented certain new and useful Improvements in Expansion-Pulleys, of which the following is a specification.

Our invention relates to improvements in expansion pulleys which will be readily understood from the following description taken in connection with the accompanying drawings in which—

Figure 2:
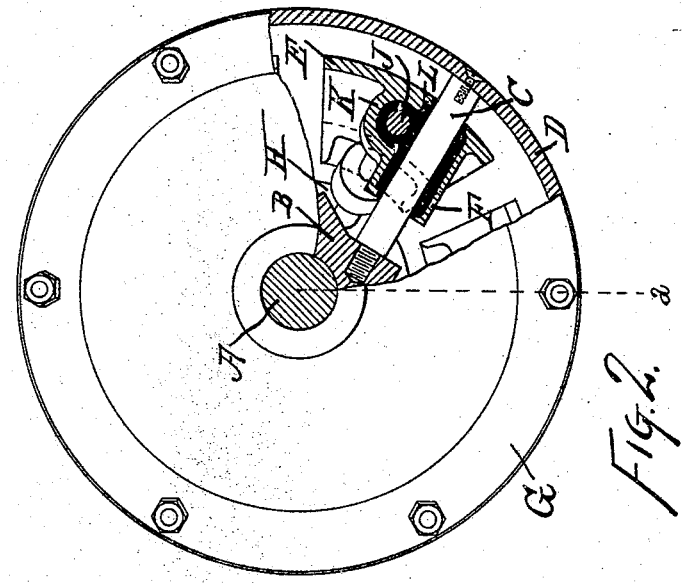
Figure 1:
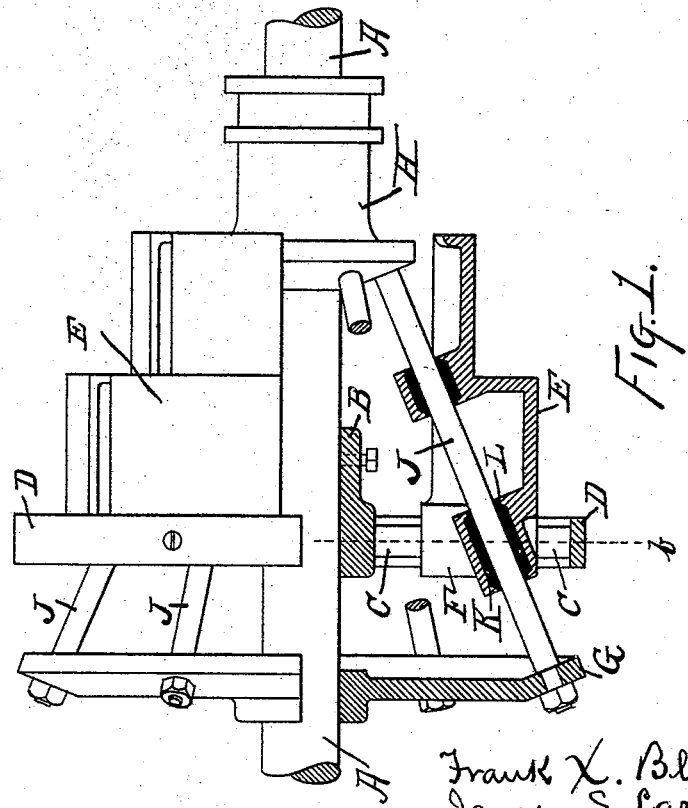

Figure 1, is a side elevation, part vertical section, in the plane of line $a$ of Fig. 2, of an expansion pulley exemplifying our improvements, and Fig. 2, an end elevation of the same (left hand end of Fig. 1) parts appearing in the plane of line $b$ of Fig. 1.

In the drawings:—A, indicates the shaft: B, the pulley-hub fast thereon: C, guide-arms rigidly secured to this hub and projecting tangentially therefrom and in a common plane at right angles to the axis of the shaft, the bodies of these guide-arms being parallel: D, a circular ring secured to and giving stability to the outer ends of the guide-arms, the hub B, arms C, and ring D, thus uniting in forming a rigid spider structure upon the shaft: E, the segmental sections of the pulley proper, as many sections as there are guide-arms, the exemplification showing these sections as forming a two step pulley, these segmental sections being arranged, as usual, in a circular series concentric with the shaft and designed to move inward or outward in effecting changes in the working diameter of the pulley: F, a socket formed upon each of the pulley sections E and engaging the appropriate one of the guide-arms C, whereby the pulley sections are adapted to slide inward and outward upon and be guided by the guide-arms: G, a disk-like structure fitted to slide upon the shaft at one side of the guiding structure formed by the hub B and arms C: H, a similar but smaller sliding disk upon the shaft at the other side of the guiding structure, this latter disk H being provided with a grooved hub through the medium of which a shifting-lever or equivalent mechanism may engage it: J, focally arranged rods with their outer ends fast in the disk G and with their inner ends fast in the disk H, the bodies of these rods being parallel or of uniform cross-section, there being one rod for each of the pulley sections E, the rods J and disks G and H, forming, together, a rigid sliding structure on the shaft: K, a socket formed upon each pulley section E and engaging the appropriate one of the rods J: and L, soft metal linings in sockets F and K.

It will be apparent that if the sliding structure H, J, G, be moved endwise upon the shaft, the rods J will slide through the sockets K and force the pulley segments E inward or outward, according to the direction in which the sliding structure is moved, the guiding structure B, C, D, furnishing the substantially radial guides for the pulley sections as they move in and out. It is preferred that the guide-arms C and the rods J be cylindrical. The rods J are focally arranged with reference to the axis of the shaft, and the guide-arms C are arranged as tangents parallel with the radial planes occupied by their respective rods J. The sockets F are K and chambered to receive the soft metal L and the socket-chambers communicate with each other, as seen in Fig. 2, whereby, when the parts are arranged in proper relationship, a single pouring of soft metal at each of the combined sockets secures a proper fitting of the segment sockets upon the rods and guide-arms.

We claim as our invention—

1. The combination, substantially as set forth, of a shaft, a disk thereon carrying a series of focally disposed rods, a hub on the shaft provided with a series of guide-arms projecting tangentially in planes parallel with the radial planes of said rods, said disk and hub being adapted for longitudinal adjustment with reference to each other, and a series of pulley segments provided with sockets engaging said rods and guide-arms.

2. The combination, substantially as set forth, of a shaft, a pair of disks mounted thereon and carrying rigidly a series of focally disposed rods, a hub upon the shaft between said disks, guide-arms projecting tangentially from said hub parallel with the radial planes of said focally disposed arms, and pulley segments provided with sockets engaging said rods and guide-arms.

3. The combination, substantially as set forth, of a shaft, a disk thereon carrying rigidly a series of focally disposed rods, a hub upon said shaft provided with a series of tangentially projecting guide-arms, a ring rigidly secured to the outer ends of said guide-arms, and a series of pulley segments provided with sockets engaging said rods and guide-arms.

4. The combination, substantially as set forth, of a shaft, a disk thereon carrying rigidly a series of focally disposed rods, a hub provided with a series of guide-arms projecting tangentially alongside said rods, and a series of pulley segments each provided with two communicating chambered sockets engaging, respectively, a guide-arm and a rod, and an integral lining for each of said two sockets.

5. The combination, substantially as set forth, of a shaft, a disk thereon, a series of cylindrical rods rigidly projecting therefrom in focal disposition, a hub on the shaft, cylindrical guide-arms projecting rigidly therefrom tangentially in planes parallel with the radial planes of said rods, and a series of pulley segments provided with cylindrical sockets engaging said guide-arms and rods.

FRANK X. BLACK.
JAMES L. CAREY.

Witnesses:
J. W. SEE,
JAS. FITTON.